United States Patent
Decoster (10) Patent No.: US 11,774,301 B2
(45) Date of Patent: Oct. 3, 2023

(54) TIRE LOAD ESTIMATION SYSTEM AND METHOD

(71) Applicant: The Goodyear Tire & Rubber Company, Akron, OH (US)

(72) Inventor: Yves Francois Claude Decoster, Ethe (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 280 days.

(21) Appl. No.: 17/228,838

(22) Filed: Apr. 13, 2021

(65) Prior Publication Data

US 2021/0389191 A1    Dec. 16, 2021

Related U.S. Application Data

(60) Provisional application No. 63/039,754, filed on Jun. 16, 2020.

(51) Int. Cl.
*G01L 1/12* (2006.01)
*B60C 23/04* (2006.01)

(52) U.S. Cl.
CPC ............ *G01L 1/12* (2013.01); *B60C 23/0488* (2013.01)

(58) Field of Classification Search
None
See application file for complete search history.

(56) References Cited

U.S. PATENT DOCUMENTS

| | | | |
|---|---|---|---|
| 5,913,240 A | 6/1999 | Draehne et al. | |
| 5,964,265 A | 10/1999 | Becherer | |
| 6,973,824 B2 | 12/2005 | Giustino et al. | |
| 7,013,721 B2 | 3/2006 | Keller et al. | |
| 7,404,317 B2 | 7/2008 | Mancosu et al. | |
| 7,536,903 B2 | 5/2009 | Schillinger et al. | |
| 7,707,876 B2 | 5/2010 | Miyoshi | |
| 7,762,129 B2 | 7/2010 | Niklas et al. | |
| 8,082,075 B2 * | 12/2011 | Hammerschmidt .. | G01M 17/02 701/34.4 |
| 8,240,198 B2 | 8/2012 | Schade et al. | |

(Continued)

FOREIGN PATENT DOCUMENTS

| | | | | |
|---|---|---|---|---|
| DE | 102017126420 A1 * | 5/2019 | ........... | B60C 11/246 |
| EP | 3428597 A1 * | 1/2019 | ............. | B60C 23/04 |
| WO | WO-2019107296 A1 * | 6/2019 | ............. | B60C 11/24 |

OTHER PUBLICATIONS

EPO Search Report received by Applicant dated Oct. 6, 2021.

*Primary Examiner* — Matthew G Marini
(74) *Attorney, Agent, or Firm* — Edward T. Kennedy (57) ABSTRACT

A method for estimating the load of a tire supporting a vehicle includes providing the tire, in which the tire includes a pair of sidewalls extending to a circumferential tread, and the tread includes a plurality of tread blocks. A length of the tire footprint is indicated with a first time interval, and a full rotation of the tire is indicated with a second time interval. The first time interval may be indicated by peaks of an amplitude of a tire-based magnetic sensor signal, and the second time interval may be indicated by peaks of the amplitude of the tire-based magnetic sensor signal or by a linear speed of the vehicle. The load on the tire is determined from a ratio of the first time interval to the second time interval at an inflation pressure of the tire. A tire load estimation system is also provided.

19 Claims, 5 Drawing Sheets

(56) References Cited

U.S. PATENT DOCUMENTS

| | | |
|---|---|---|
| 8,255,114 B2 | 8/2012 | Fink et al. |
| 8,742,911 B2 | 6/2014 | Wagner et al. |
| 9,120,356 B2 | 9/2015 | Patel et al. |
| 9,248,707 B2 | 2/2016 | Zhou et al. |
| 9,310,242 B2 | 4/2016 | Kammann et al. |
| 10,543,849 B2 | 1/2020 | Jankowski et al. |
| 10,596,862 B1 | 3/2020 | Cappello et al. |
| 2003/0159503 A1* | 8/2003 | Mancuso ............... B60T 8/172 73/146 |
| 2008/0245455 A1 | 10/2008 | Spetler |
| 2010/0276044 A1* | 11/2010 | Heise ..................... G01B 7/26 73/146 |
| 2018/0066929 A1* | 3/2018 | Kandler ................ B60C 23/04 |
| 2018/0186198 A1 | 7/2018 | Zhou et al. |
| 2019/0025113 A1 | 1/2019 | Masago |
| 2020/0062268 A1* | 2/2020 | Steiner ............... B60C 23/0449 |
| 2020/0173872 A1 | 6/2020 | Takedomí |
| 2020/0408643 A1 | 12/2020 | Mizuta |
| 2021/0389191 A1 | 12/2021 | Decoster |

\* cited by examiner

TIRE LOAD ESTIMATION SYSTEM AND METHOD

FIELD OF THE INVENTION

The invention relates generally to tire monitoring systems and methods. More particularly, the invention relates to systems and methods that monitor tire conditions, such as tire load. The invention is directed to a system and method for estimating or determining tire load based on deformation of the tire at the tire footprint as indicated by the duration of the footprint.

BACKGROUND OF THE INVENTION

The load on each tire of a vehicle plays an important role in vehicle factors such as handling, safety, reliability, and performance. Measurement or estimation of the load on a tire during the operation of a vehicle is often used by vehicle control systems such as braking, traction, stability, and suspension systems. For instance, information about individual tire loads enables precise estimation of the load distribution between the front and the rear axle of the vehicle, which can then be used to optimize the brake control system. Alternatively, knowledge of tire loads and consequently the vehicle mass may enable more accurate estimation of the remaining range of an electric vehicle. Thus, it is desirable to estimate the load on a tire in an accurate and reliable manner for input or use in such systems.

Prior art approaches have involved attempts at directly measuring tire load using load or strain sensors. Such direct-measurement techniques have experienced disadvantages due to the difficulty in achieving a sensor with a construction and placement on the tire that enables accurate and consistent measurement of tire load, particularly over the life of a tire.

Other prior art approaches have been developed that involve estimation of tire load using fixed parameters. Such prior art approaches have experienced disadvantages since techniques that rely upon fixed parameters often lead to less-than-optimum predictions or estimations, which in turn reduces the accuracy and/or reliability of the tire load predictions.

It is also advantageous if a system is capable of monitoring or determining conditions in additional to tire load. For example, it may be desirable to monitor tire wear, which may improve the calculation of the tire load. Moreover, detection of hydroplaning or low road grip situations may also be advantageous.

As a result, there is a need in the art for a system and method that accurately and reliably estimates tire load, and optionally determines additional tire conditions.

SUMMARY OF THE INVENTION

According to an aspect of an exemplary embodiment of the invention, a method for estimating the load of a tire supporting a vehicle is provided. The method includes providing the tire, in which the tire includes a pair of sidewalls extending to a circumferential tread, and the tread includes a plurality of tread blocks. One of the tread blocks is selected, and the selected one of the tread blocks deforms upon contact with the ground. A tread cavity is defined in the selected one of the tread blocks, and a magnetic element is disposed in the tread cavity and generates a magnetic field. A magnetic sensor is mounted in a tire cavity proximate the magnetic element to sense the magnetic field. A signal is delivered by the magnetic sensor. An electronic module is connected to the magnetic sensor by electronic means and includes a processor. A tire footprint entry point and a footprint exit point is indicated by an amplitude of the signal. A length of the tire footprint is indicated by a first time interval between peaks of the amplitude of the signal, and a full rotation of the tire is indicated by a second time interval that is determined by a distance between peaks of the amplitude of the signal or by a linear speed of the vehicle. The load on the tire is determined with the processor from a ratio of the first time interval to the second time interval at an inflation pressure of the tire.

According to an aspect of another exemplary embodiment of the invention, a tire load estimation system includes at least one tire supporting a vehicle. The tire includes a pair of sidewalls extending to a circumferential tread, which includes a plurality of tread blocks. A footprint is created when the tread contacts the ground and includes an entry point, an exit point, and a length between the entry and exit points. A selected one of the tread blocks defines a tread cavity and deforms upon contact with the ground. A magnetic element is disposed in the tread cavity and generates a magnetic field. A magnetic sensor is disposed in a tire cavity proximate the magnetic element to sense the magnetic field and generates a signal. An electronic module is connected to the magnetic sensor by electronic means and includes a processor. An amplitude of the signal indicates the footprint entry point and the footprint exit point. A first time interval between peaks of the amplitude of the signal indicates the footprint length, and a second time interval indicates a full rotation of the tire. The second time interval is determined from a distance between peaks of the amplitude of the signal or a linear speed of the vehicle. The processor determines the load on the tire from a ratio of the first time interval to the second time interval at an inflation pressure of the tire.

BRIEF DESCRIPTION OF THE DRAWINGS

The invention will be described by way of example and with reference to the accompanying drawings, in which.

Similar numerals refer to similar parts throughout the drawings.

Definitions

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface, such as the ground, as the tire rotates or rolls.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Tread element" or "tread block" means a segment of the tread that contacts the ground or road and is defined by grooves.

"Tread Arc Width" means the arc length of the tread as measured between the lateral edges of the tread.

DETAILED DESCRIPTION OF THE INVENTION

Figure 1:
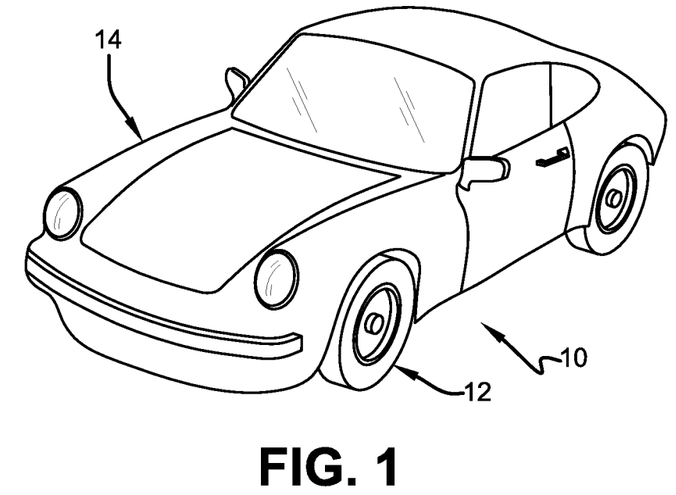
FIG. 1 is a perspective view of a vehicle supported by tires employing a first exemplary embodiment of the tire load estimation system and method of the present invention.

The invention includes a tire load estimation system and method that determines tire load based on deformation of the tire at the tire footprint, as indicated by the duration of the footprint. A first exemplary embodiment of the tire load estimation system of the present invention is indicated at 10 in FIGS. 1 through 7. With particular reference to FIG. 1, the system 10 estimates the load on each tire 12 supporting a vehicle 14. While the vehicle 14 is depicted as a passenger car, the invention is not to be so restricted. The principles of the invention find application in other vehicle categories such as commercial trucks in which vehicles may be supported by more or fewer tires than shown in FIG. 1.

Figure 2:
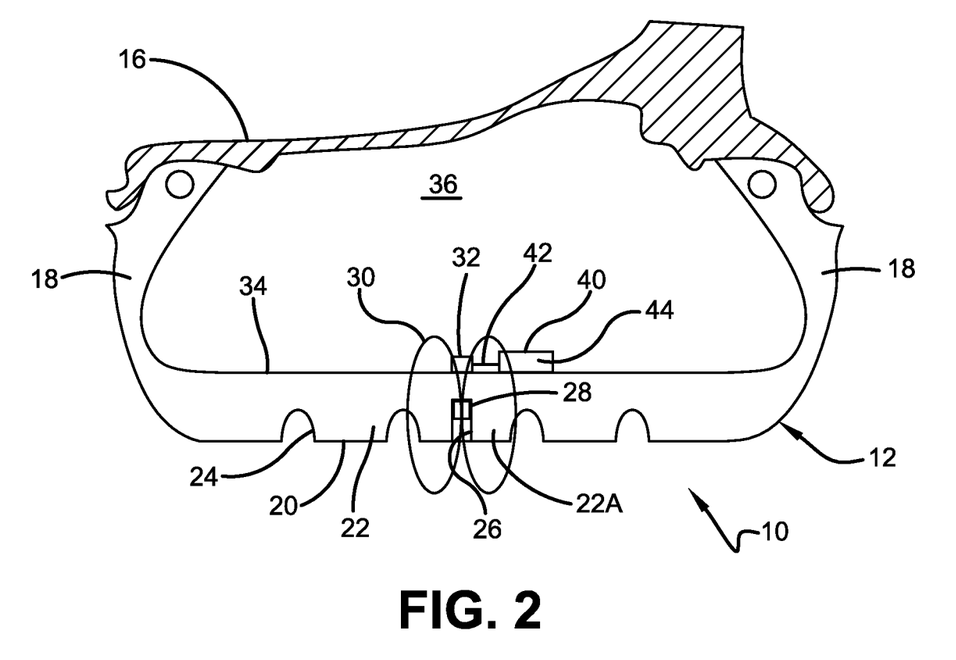
FIG. 2 is a cross-sectional view of a portion of a tire and wheel shown in FIG. 1.

With additional reference to FIG. 2, each tire 12 is of a conventional construction and is mounted on a wheel 16. Each tire 12 includes a pair of sidewalls 18 that extend to a circumferential tread 20, which engages the ground during vehicle operation. An innerliner 34 is formed on the interior of the tire 12, and a tire cavity 36 is created when the tire is mounted on the wheel 16. On the tread 20, tread elements or tread blocks 22 are defined by grooves 24.

Figure 3:
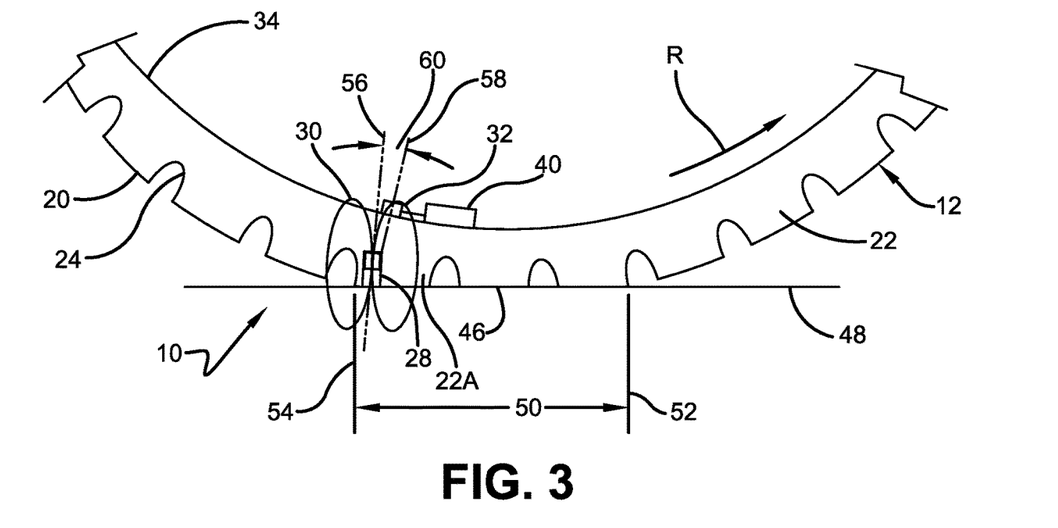
FIG. 3 is a schematic representation of an elevational view of a portion of a tire shown in FIG. 2.

As shown in FIG. 3, as the tire 12 rotates, indicated by arrow R, a contact patch or footprint 46 is created by the portion of the tread 20 that contacts the ground 48. The footprint 46 includes an entry point 52 and an exit point 54, and a length 50 between the entry and exit points. The first exemplary embodiment of tire load estimation system 10 determines tire load based on tire characteristics and tire-based measurements.

More particularly, returning to FIG. 2, a tread cavity 26 is defined in a selected one of the tread blocks 22A, and a magnetic element 28 is disposed in the tread cavity. In this manner, the magnetic element 28 is embedded in the selected tread block 22A. The magnetic element 28 generates a magnetic field 30 and preferably is a permanently magnet that may be formed of a ferromagnetic material, rare-earth material and the like. In addition, the magnetic element 28 preferably is of a cylindrical shape for embedding in the selected tread block 22A. Moreover, the magnetic element 28 preferably is homogeneously magnetized so that the magnetic field 30 produced or generated by the magnetic element 28 is proportional to its remaining length.

The tire load estimation system 10 also includes a magnetic sensor 32 that is disposed in the tire cavity 36, and preferably is attached to the innerliner 34. The magnetic sensor 32 preferably is disposed proximate the magnetic element 28 for precision sensing of the magnetic field 30. For optimum sensing of the magnetic field 30, the magnetic sensor 32 preferably is attached to the innerliner 34 in radial and circumferential alignment with the magnetic element 28. The magnetic sensor 32 preferably is a single, 2 or 3-axis magnetometer or Hall-effect sensor.

The tire load estimation system 10 further includes an electronic module 40, which is connected to the magnetic sensor 32 by electronic means 42. The electronic means 42 may include wires, a wireless connection, or electronic integration of the magnetic sensor 32 into the electronic module 40. The electronic module 40 provides power and communication for the magnetic sensor 32, and preferably includes a processor 44 to execute aspects of the tire load estimation system 10, as will be described below.

Preferably, the electronic module 40 is a tire pressure management system (TPMS) sensor that includes electronic integration of the magnetic sensor 32. The TPMS sensor 40 preferably is a commercially-available TPMS module or sensor, which is affixed to the innerliner 34 by suitable means such as adhesive. The TPMS sensor 40 preferably includes a pressure sensor to sense the inflation pressure within the tire cavity 36, and may optionally include a temperature sensor to sense the temperature of the tire 12 and/or the temperature in the tire cavity.

The electronic module 40 preferably also includes a processor and memory to store tire identification (tire ID) information for each specific tire 12. For example, the tire ID may include manufacturing information for the tire 12, including: the tire model; size information, such as rim size, width, and outer diameter; manufacturing location; manufacturing date; a treadcap code that includes or correlates to a compound identification; and a mold code that includes or correlates to a tread structure identification. The tire ID may also include a service history or other information to identify specific features and parameters of each tire 12. The electronic module 40 includes or is in electronic communication with an antenna for transmitting measured parameters and tire ID data to a remote processor, such as a processor integrated into the vehicle CAN bus, for analysis.

Referring again to FIG. 3, during the rotation R of the tire 12, the selected tread block 22A where the magnetic element 28 is installed deforms when it is in contact with the ground 48. Such deformation modifies the position of the magnetic element 28 due to compression and shear forces acting on the selected tread block 22A. As described above, the magnetic sensor 32 preferably is attached to the innerliner 34 in radial and circumferential alignment with the magnetic element 28, as shown by a first axis 56. The modified position of the magnetic element 28 during deformation of the selected tread block 22A is indicated by a second axis 58, with the change in position represented by arc 60. The change 60 in the position of the magnetic element 28 modifies the magnetic field 30, and the modification of the magnetic field is measured by the magnetic sensor 32. The most pronounced variations in the magnetic field 30 occur at the entry point 52 and the exit point 54 of the footprint 46.

Figure 4:
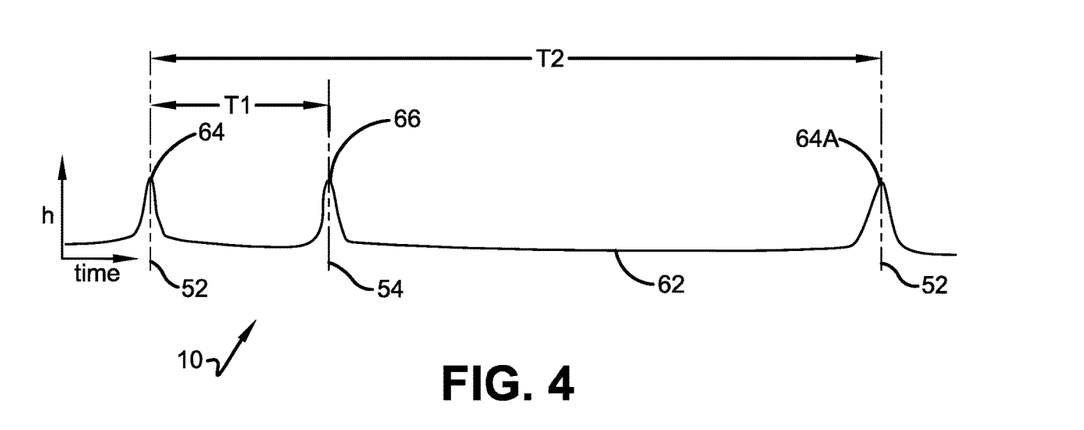
FIG. 4 is a graphical representation of a signal of the first exemplary embodiment of the tire load estimation system and method of the present invention.

With reference to FIG. 4, the magnetic sensor 32 delivers a signal 62. The signal 62 includes an amplitude indicated at h, which may be represented over time. The amplitude h of a typical magnetic sensor signal 62 includes a first peak 64 at the entry point 52 of the footprint 46 and a second peak 66 at the exit point 54 of the footprint. It is to be understood that the signal 62 shown in FIG. 4 is represented in simplified form, as additional peaks or characteristics may be visible due to the presence of metallic components near the wheel 16. As a result, the signal 62 as delivered by the magnetic sensor 32 may be treated or filtered using techniques known in the art, such as a low-pass filter.

A first time interval, indicated by T1, occurs between the first peak 64 and the second peak 66, and is measured by the processor 44. The first time interval T1 provides a time that indicates the footprint length 50. The first peak 64 of the amplitude h re-occurs 64A upon a full rotation of the tire 12 at a second time interval T2, as the first peak corresponds to the magnetic sensor signal 62 at the footprint entry point 52. The second time interval T2 may alternatively be determined by the second peak 66 of the amplitude h, which re-occurs upon a full rotation of the tire 12 at the footprint exit point 54. Thus, the second time interval T2 provides a time that indicates a full rotation of the tire 12.

In the tire load estimation system 10, the ratio of the first time interval T1 to the second time interval T2 enables the load on the tire 12 to be calculated when the inflation pressure and the size of the tire 12 are known. For example, as described above, the electronic module or TPMS sensor 40 includes a pressure sensor to sense the inflation pressure within the tire cavity 36, and a processor and memory to store tire ID information, including size information, for the tire 12.

Figure 5:
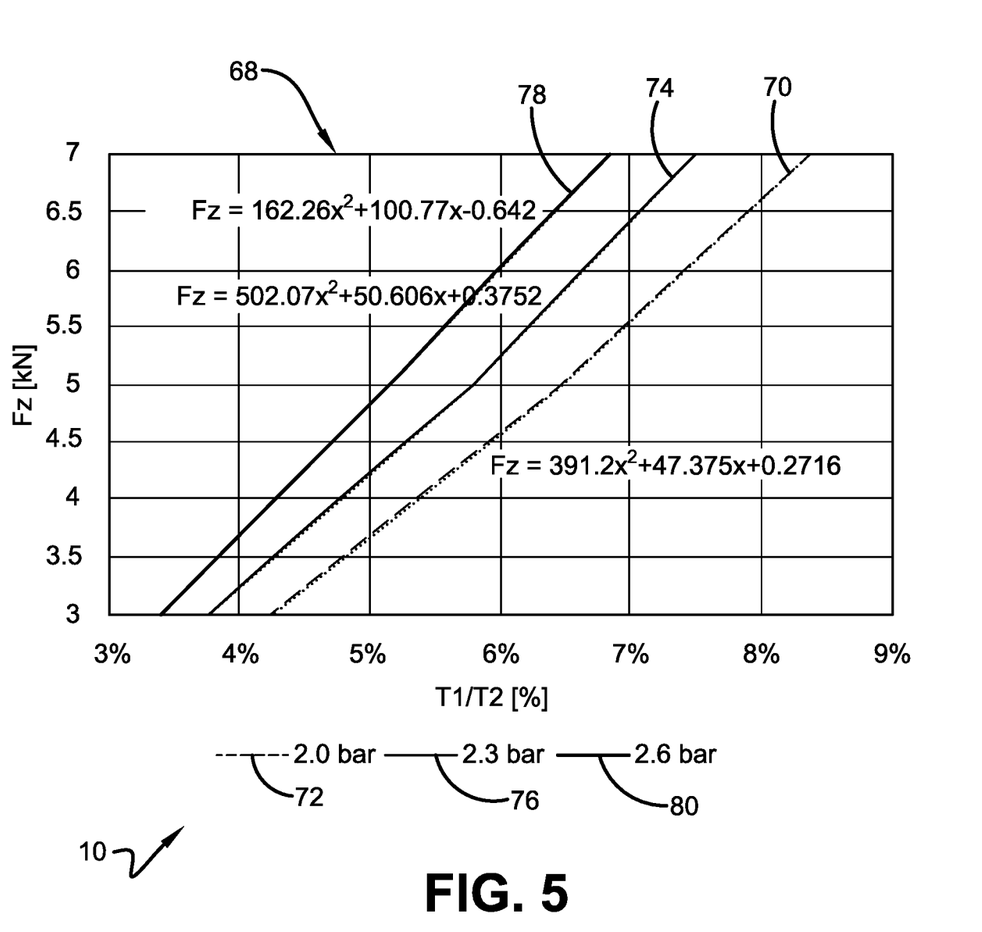
FIG. 5 is a graphical representation of an exemplary plot used to determine tire load according to the tire load estimation system and method of the present invention.

As shown in FIG. 5, a plot 68 may be generated for a specific size of the tire 12, which in this example is a 205/55R16 passenger tire. The plot 68 includes a first line 70 generated from the ratio of the first time interval T1 to the second time interval T2 at a first pressure 72, as measured by the electronic module or TPMS sensor 40, versus the load on the tire 12 as represented by a vertical force indicator Fz. The first line 70 may be generated as a polynomial transfer function. In this manner, for the first pressure 72, the tire load Fz may be extracted from the first line 70. Likewise, the plot 68 may include a second line 74 generated from the ratio of T1 to T2 at a second pressure 76, and a third line 78 generated from the ratio of T1 to T2 at a third pressure 80. From each line 70, 74 and 78, the load Fz on the tire 12 can be determined at each respective pressure 72, 76 and 80.

Other techniques may be employed to determine the load Fz on a specific tire 12 from the ratio of T1 to T2 at a measured tire pressure. For example, machine learning algorithms may be employed, such as regression analyses including decision tree models and gradient tree boosting.

Returning to FIG. 3, the accuracy of the tire load estimation system 10 may be improved by measuring tread depth or tire wear from the magnetic field 30. More particularly, as the tread 20 of the tire 12 wears, the footprint 46 changes, which affects the values of T1 and T2. Thus, measurement of the decreasing depth of the tread 20 may increase the accuracy of the determination of tire load Fz. The magnetic element 28 may be made of an abradable material, so that the magnetic element abrades with the selected tread block 22A. As the magnetic element 28 abrades, the magnetic field 30 decays. The peaks 64 and 66 of the amplitude h of the magnetic sensor signal 62 decrease as the magnetic field 30 decays. As a result, decreased depth of the tread 20 is reflected in the amplitude h of the magnetic sensor signal 62, and may be detected by the processor 44.

Figure 6:
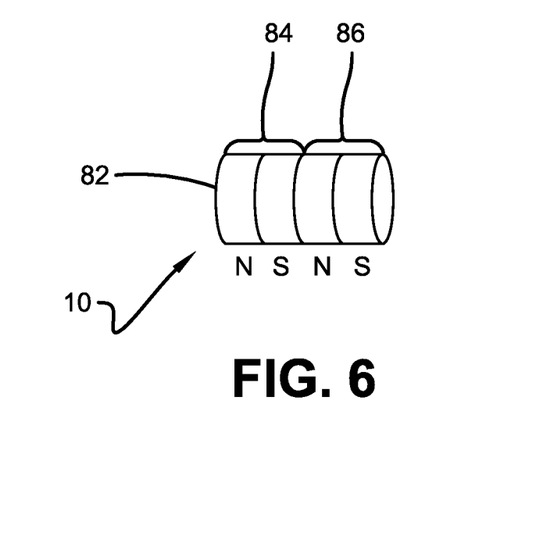
FIG. 6 is a schematic representation of an alternative magnetic element for the first exemplary embodiment of the tire load estimation system and method of the present invention.

The magnetic element 28 shown in FIGS. 2 and 3 preferably is a homogeneously magnetized element, as described above. As shown in FIG. 6, an alternative magnetic element 82 may include a plurality of radially stacked magnets, such as a first stacked magnet 84 and a second stacked magnet 86. The first stacked magnet 84 and the second stacked magnet 86 are of different magnetic strengths, materials and/or shapes from one another, which generates a magnetic field 30 that is not linearly proportional to the length of the magnetic element 82. The alternative magnetic element 82 may be employed to tune and increase the sensitivity of a measurement of the depth of the tread 20 as the tire 12 approaches the end of its life, when greater accuracy of the sensed magnetic field 30 may be desirable. For example, the alternative magnetic element 82 may be oriented in the tread cavity 26 with the first stacked magnet 84 radially inwardly and the second stacked magnet 86 radially outwardly, and the first stacked magnet has a greater magnetic strength than the second stacked magnet to generate an effective magnetic field as the tread 20 wears.

Figure 7:
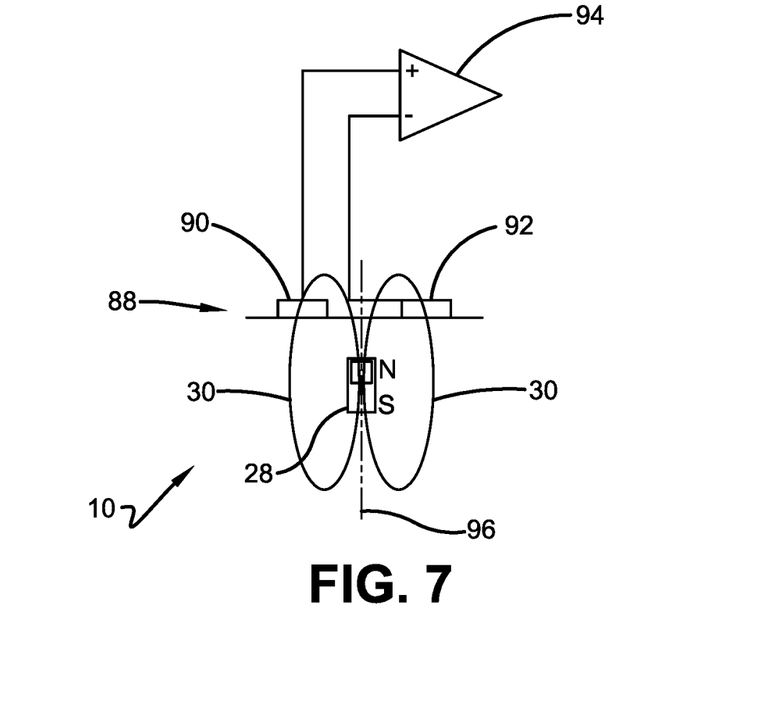
FIG. 7 is a schematic representation of an alternative magnetic sensor for the first exemplary embodiment of the tire load estimation system and method of the present invention.

As described above, the magnetic sensor 32 preferably is a single, 2 or 3-axis magnetometer or Hall-effect sensor. As shown in FIG. 7, an alternative magnetic sensor 88 includes a first sensor unit 90 and a second sensor unit 92, which are symmetrically positioned around a neutral axis 96 of the magnetic element 28 to sense the magnetic field 30. The first sensor unit 90 and the second sensor unit 92 may be oriented in a circumferential direction or a lateral direction around the neutral axis 96 of the magnetic element 28. Preferably, the first sensor unit 90 and the second sensor unit 92 are oriented in a lateral direction around the neutral axis 96. The use of the first sensor unit 90 and the second sensor unit 92 positioned in such a manner reduces error that may be introduced by the effect of the magnetic field of the earth by capturing a differential signal 94. The differential signal 94 is the difference between the signal from each of the first sensor unit 90 and the second sensor unit 92.

In this manner, the first embodiment of the tire load estimation system 10 of the present invention accurately and reliably estimates tire load. The tire load estimation system 10 employs a magnetic element 28 disposed in a selected tread block 22A and a magnetic sensor 32, which delivers a signal 62 including time intervals between amplitude peaks 64, 66 that enable the load Fz to be determined. The tire load estimation system 10 may also monitor tire wear or tread depth, which improves the calculation of the tire load Fz.

The tire load estimation system 10 also optionally detects hydroplaning or low road grip situations. Hydroplaning occurs when there is a layer of water between the road surface or ground 48 and the tire tread 20. The water layer alters the shear and compression stress in the selected tread block 22A and generates noise on the signal 62 of the magnetic sensor 32. Such noise is observable in the amplitude h of the signal 62, and can be identified by the processor 44 to detect a hydroplaning or low road grip situation.

The first exemplary embodiment of tire load estimation system 10 thus determines or estimates tire load Fz at the tire level, based upon tire characteristics and tire-based measurements. By estimating tire load Fz at the tire level, the load determination may be made in the electronic module 40. By being extracted from the same magnetic sensor signal 62, the first time interval T1 and the second time interval T2 are synchronized, providing greater accuracy. In addition, the tire load Fz as determined by the first embodiment of the tire load estimation system 10 may be a static load when the vehicle 14 is operating in steady driving conditions, and a dynamic load when the vehicle is maneuvering through curves and the vehicle load shifts from one side of the vehicle to the other.

Figure 8:
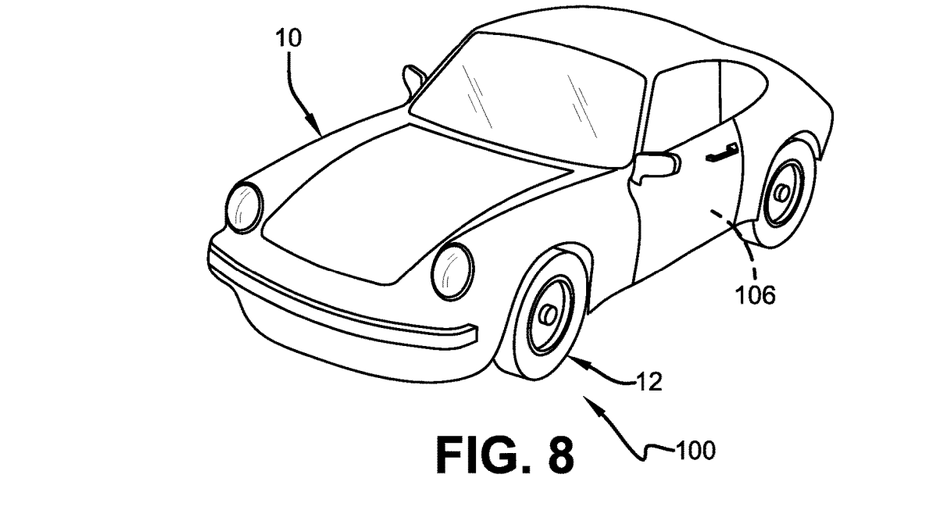
FIG. 8 is a perspective view of a vehicle supported by tires employing a second exemplary embodiment of the tire load estimation system and method of the present invention.
Figure 9:
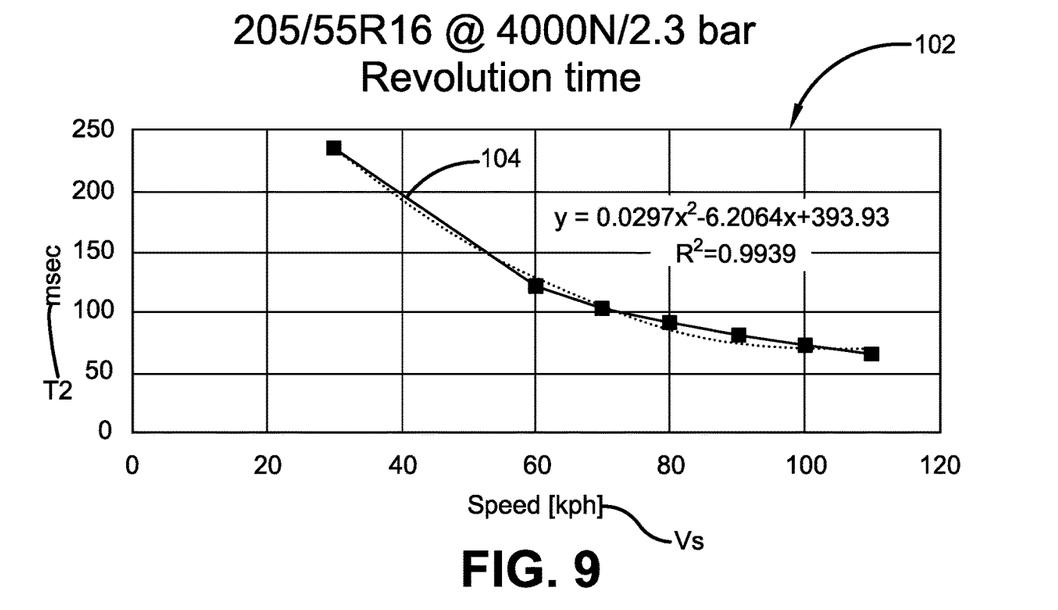
FIG. 9 is a graphical representation of an exemplary plot used to determine tire footprint characteristics according to the second exemplary embodiment of the tire load estimation system and method of the present invention.

Turning to FIGS. 8 and 9, a second exemplary embodiment of the tire load estimation system of the present invention is indicated at 100. The first embodiment of the tire load estimation system 10 and the second embodiment of the tire load estimation system 100 both employ the magnetic sensor signal 62 to obtain the first time interval T1 that corresponds to the duration of the footprint 46. In contrast to the first embodiment of the tire load estimation system 10, the second embodiment of the tire load estimation system 100 obtains the second time interval T2 that corresponds to the rotation time of the tire 12 from vehicle-based measurements, including vehicle speed.

With particular reference to FIG. 8, the second embodiment of the tire load estimation system 100 estimates the load on each tire 12 supporting the vehicle 14. The tire 12 of the second embodiment of the tire load estimation system 100 is similar in construction to the first embodiment of the tire load estimation system 10 (FIGS. 1-3), being mounted on the wheel 16, and including the pair of sidewalls 18 that extend to the circumferential tread 20, the innerliner 34, the tire cavity 36, and tread elements or tread blocks 22 defined by grooves 24. Preferably, the TPMS sensor 40 is mounted on the tire innerliner 34. The second embodiment of the tire load estimation system 100 also includes the tire contact patch or footprint 46, which in turn includes the entry point 52, the exit point 54, and the length 50 between the entry and exit points.

The second embodiment of the tire load estimation system 100 employs the signal 62 from the magnetic sensor 32, shown in FIG. 4. The signal 62 includes amplitude h, including the first peak 64 at the entry point 52 of the footprint 46 and the second peak 66 at the exit point 54 of the footprint. The first time interval T1, occurs between the first peak 64 and the second peak 66, and provides a time that indicates a duration of the tire footprint 46.

In the second embodiment of the tire load estimation system 100, the linear speed of the vehicle 14 is used to calculate the second time interval T2, which indicates a full rotation of the tire 12. A first example of calculating the second time interval T2 from the vehicle speed is shown in FIG. 9, which is a plot 102 that may be generated for a specific size of the tire 12, which in this example is a 205/55R16 passenger tire. The plot 102 includes a line 104 generated from a graph of the revolution or rotation time T2 of the tire 12 versus the vehicle speed Vs at a given load. Using the line 104, the second time interval T2 may be extracted when the vehicle speed Vs is known.

A second example of calculating the full tire rotation or second time interval T2 from the vehicle speed may be performed according to the following calculation:

$$T_2 = \frac{2 \cdot \pi \cdot R_{tire}}{S_{vehicle}}$$

In this calculation, $R_{tire}$ is the external radius of the tire 12, and $S_{vehicle}$ is the vehicle linear speed Vs. In this manner, the second time interval T2 is determined using the vehicle speed Vs, which may be obtained from the vehicle CAN bus 106.

As with the first embodiment of the tire load estimation system 10, in the second embodiment of the tire load estimation system 100, the ratio of the first time interval T1 to the second time interval T2 enables the load on the tire 12 to be calculated when the inflation pressure and the size of the tire 12 are known. For example, returning to FIG. 5, the plot 68 of the ratio of the first time interval T1 to the second time interval T2 at a first pressure 72 versus the tire load Fz generates a first line 70. Likewise, the plot 68 may include the second line 74 generated from the ratio of T1 to T2 at a second pressure 76, and the third line 78 generated from the ratio of T1 to T2 at a third pressure 80. From each line 70, 74 and 78, the load Fz on the tire 12 can be determined or extracted at each respective pressure 72, 76 and 80. Each line 70, 74 and 78 may be generated as a polynomial transfer function. Other techniques may be employed to determine the load Fz on a specific tire 12 from the ratio of T1 to T2, including machine learning algorithms.

In this manner, the second embodiment of the tire load estimation system 100 of the present invention accurately and reliably estimates tire load. The tire load estimation system 100 employs indication of the vehicle speed Vs to enable a determination of the duration of one revolution or rotation of the tire 12, which in turn enables the tire load Fz to be determined. Because the vehicle speed Vs may be obtained from the vehicle CAN bus 106, the second embodiment of the tire load estimation system 100 may include greater involvement of the vehicle CAN bus. For example, calculation of the tire load Fz at the vehicle level using the vehicle CAN bus 106 may enable a distinction between dynamic and static load, as a determination as to whether the vehicle 14 is in a steady state may be available from the CAN bus, which provides communication between multiple vehicle sensors and systems. In addition, calculation of the tire load Fz at the vehicle level may allow access to more powerful processors through the CAN bus 106, providing faster and more powerful computation than the tire-based electronic module 40.

The present invention also includes a method for estimating the load of a tire 12. The method includes steps in accordance with the description that is presented above and shown in FIGS. 1 through 9.

It is to be understood that the structure and method of the above-described tire load estimation system may be altered or rearranged, or components or steps known to those skilled in the art omitted or added, without affecting the overall concept or operation of the invention.

The invention has been described with reference to preferred embodiments. Potential modifications and alterations will occur to others upon a reading and understanding of this description. It is to be understood that all such modifications and alterations are included in the scope of the invention as set forth in the appended claims, or the equivalents thereof.

What is claimed is:

1. A method for estimating the load of a tire supporting a vehicle, the method comprising the steps of:
   providing the tire, the tire including a pair of sidewalls extending to a circumferential tread, the tread including a plurality of tread blocks;
   selecting one of the tread blocks, the selected one of the tread blocks deforming upon contact with the ground;
   defining a tread cavity in the selected one of the tread blocks;
   disposing a magnetic element in the tread cavity, the magnetic element generating a magnetic field, wherein the magnetic element includes a plurality of radially stacked magnets, wherein at least one stacked magnet is of at least one of a different magnetic strength, a different material, and a different shape from at least one other stacked magnet;
   mounting a magnetic sensor in a tire cavity proximate the magnetic element to sense the magnetic field;
   delivering a signal with the magnetic sensor;
   connecting an electronic module to the magnetic sensor by electronic means, the electronic module including a processor;
   indicating a tire footprint entry point and a footprint exit point with an amplitude of the signal;
   indicating a length of the tire footprint with a first time interval between peaks of the amplitude of the signal;
   indicating a full rotation of the tire with a second time interval, the second time interval being determined from at least one of a distance between peaks of the amplitude of the signal and a linear speed of the vehicle; and
   determining with the processor the load on the tire from a ratio of the first time interval to the second time interval at an inflation pressure of the tire.

2. The method for estimating the load of a tire supporting a vehicle of claim 1, wherein the tire load is extracted from at least one of a plot including a line generated from the ratio of the first time interval to the second time interval at the inflation pressure versus the tire load, and a machine learning algorithm.

3. The method for estimating the load of a tire supporting a vehicle of claim 2, wherein the line is generated as a polynomial transfer function.

4. The method for estimating the load of a tire supporting a vehicle of claim 1, further comprising the steps of:
   modifying a position of the magnetic element upon the deformation of the selected one of the tread blocks;
   modifying the magnetic field in response to the modification of the position of the magnetic element; and
   measuring the modification of the magnetic field with the magnetic sensor.

5. The method for estimating the load of a tire supporting a vehicle of claim 1, wherein the electronic means includes at least one of wires, a wireless connection, and electronic integration of the magnetic sensor into the electronic module.

6. The method for estimating the load of a tire supporting a vehicle of claim 1, wherein the electronic module includes a tire pressure management system sensor, which includes a pressure sensor to sense the inflation pressure of the tire.

7. The method for estimating the load of a tire supporting a vehicle of claim 1, wherein the electronic module includes a memory to store tire identification information, including tire size information.

8. The method for estimating the load of a tire supporting a vehicle of claim 1, wherein the magnetic element is a permanent magnet.

9. The method for estimating the load of a tire supporting a vehicle of claim 1, wherein an innerliner is formed on the interior of the tire, and the magnetic sensor is attached to the innerliner in radial and circumferential alignment with the magnetic element.

10. The method for estimating the load of a tire supporting a vehicle of claim 1, wherein the magnetic sensor includes at least one of a single axis magnetometer, a 2-axis magnetometer, a 3-axis magnetometer, and a Hall-effect sensor.

11. The method for estimating the load of a tire supporting a vehicle of claim 1, further comprising the step of forming the magnetic element of an abradable material to abrade with wear of the selected one of the tread blocks, whereby the magnetic field decays as the magnetic element abrades, and the peaks of the amplitude of the magnetic sensor signal decrease as the magnetic field decays.

12. The method for estimating the load of a tire supporting a vehicle of claim 1, further comprising the step of identifying with the processor a noise in the amplitude of the signal created by a layer of water between the ground and the tread.

13. The method for estimating the load of a tire supporting a vehicle of claim 1, wherein the determination of the second time interval from the linear speed of the vehicle includes determining the second time interval from a ratio of the external radius of the tire to the linear speed of the vehicle.

14. The method for estimating the load of a tire supporting a vehicle of claim 1, wherein the determination of the second time interval from the linear speed of the vehicle includes extracting the second time interval from a plot including a line generated from a ratio of a time of the full rotation of the tire versus the linear speed of the vehicle.

15. A tire load estimation system comprising:
   at least one tire supporting a vehicle, the at least one tire including a pair of sidewalls extending to a circumferential tread, the tread including a plurality of tread blocks;
   a footprint created when the tread contacts the ground, the footprint including an entry point, an exit point, and a length between the entry and exit points;
   a selected one of the tread blocks defining a tread cavity and deforming upon contact with the ground;
   a magnetic element disposed in the tread cavity, the magnetic element generating a magnetic field, wherein the magnetic element includes a plurality of radially stacked magnets, wherein at least one stacked magnet is of at least one of a different magnetic strength, a different material, and a different shape from at least one other stacked magnet;
   a magnetic sensor disposed in a tire cavity proximate the magnetic element to sense the magnetic field, the magnetic sensor generating a signal;
   an electronic module connected to the magnetic sensor by electronic means, the electronic module including a processor;
   an amplitude of the signal indicating the footprint entry point and the footprint exit point;
   a first time interval between peaks of the amplitude of the signal indicating the footprint length;
   a second time interval indicating a full rotation of the tire and being determined from at least one of a distance between peaks of the amplitude of the signal and a linear speed of the vehicle; and the processor determining the load on the tire from a ratio of the first time interval to the second time interval at an inflation pressure of the tire.

16. The tire load estimation system of claim 15, wherein the determination of the second interval from the linear speed of the vehicle includes a ratio of the external radius of the tire to the linear speed of the vehicle.

17. The tire load estimation system of claim 15, wherein the determination of the second interval from the linear speed of the vehicle includes a plot with a line generated from a ratio of a time of the full rotation of the tire versus the linear speed of the vehicle.

18. A method for estimating the load of a tire supporting a vehicle, the method comprising the steps of:
  providing the tire, the tire including a pair of sidewalls extending to a circumferential tread, the tread including a plurality of tread blocks;
  selecting one of the tread blocks, the selected one of the tread blocks deforming upon contact with the ground;
  defining a tread cavity in the selected one of the tread blocks;
  disposing a magnetic element in the tread cavity, the magnetic element generating a magnetic field;
  mounting a magnetic sensor in a tire cavity proximate the magnetic element to sense the magnetic field, wherein the magnetic sensor includes a first sensor unit and a second sensor unit that are symmetrically positioned around a neutral axis of the magnetic element to generate a differential signal;
  delivering the differential signal with the magnetic sensor;
  connecting an electronic module to the magnetic sensor by electronic means, the electronic module including a processor;
  indicating a tire footprint entry point and a footprint exit point with an amplitude of the differential signal;
  indicating a length of the tire footprint with a first time interval between peaks of the amplitude of the differential signal;
  indicating a full rotation of the tire with a second time interval, the second time interval being determined from at least one of a distance between peaks of the amplitude of the differential signal and a linear speed of the vehicle; and
  determining with the processor the load on the tire from a ratio of the first time interval to the second time interval at an inflation pressure of the tire.

19. A tire load estimation system comprising:
  at least one tire supporting a vehicle, the at least one tire including a pair of sidewalls extending to a circumferential tread, the tread including a plurality of tread blocks;
  a footprint created when the tread contacts the ground, the footprint including an entry point, an exit point, and a length between the entry and exit points;
  a selected one of the tread blocks defining a tread cavity and deforming upon contact with the ground;
  a magnetic element disposed in the tread cavity, the magnetic element generating a magnetic field;
  a magnetic sensor disposed in a tire cavity proximate the magnetic element to sense the magnetic field, wherein the magnetic sensor includes a first sensor unit and a second sensor unit that are symmetrically positioned around a neutral axis of the magnetic element to generate a differential signal;
  an electronic module connected to the magnetic sensor by electronic means, the electronic module including a processor;
  an amplitude of the differential signal indicating the footprint entry point and the footprint exit point;
  a first time interval between peaks of the amplitude of the differential signal indicating the footprint length;
  a second time interval indicating a full rotation of the tire and being determined from at least one of a distance between peaks of the amplitude of the differential signal and a linear speed of the vehicle; and
  the processor determining the load on the tire from a ratio of the first time interval to the second time interval at an inflation pressure of the tire.

* * * * *